Aug. 28, 1928. 1,682,720

J. BIJUR

COUPLING

Filed April 30, 1919

INVENTOR
JOSEPH BIJUR

BY Arthur E. Davis
ATTORNEY

Patented Aug. 28, 1928.

1,682,720

UNITED STATES PATENT OFFICE.

JOSEPH BIJUR, OF NEW YORK, N. Y.

COUPLING.

Application filed April 30, 1919. Serial No. 293,655.

This invention relates to mechanical power transmitting means, and with regard to its more specific features to couplings for driving magnetos or the like.

One object of this invention is to provide an efficient coupling for transmitting power between shafts inaccurately aligned, which coupling shall be durable in construction, and which shall effectively avoid looseness of parts and consequent noise.

Another object is to provide a coupling of the above type which shall act without substantial lateral pressure or loss of power, though the shafts connected be somewhat displaced laterally or angularly or though they be in slightly different planes.

Another object is to provide a coupling of the above type which will satisfactorily transmit the torque between shafts inaccurately aligned in any of the manners referred to above, while preventing any relative displacement between the shafts in the direction of rotation.

Another object is to provide a coupling of the above type which shall be relatively durable, short and compact.

Another object is to provide a coupling of the above type which shall be readily susceptible of application or detachment from driving relation without the exertion of substantial strain on the parts thereof.

Another object is to provide a coupling of the above type having any or all of the properties set forth above, for efficiently driving a magneto or the like, accurately maintaining the timing thereof, though the driving shaft and the magneto shaft are misaligned in any respect within the limits encountered in practice, when no special precautions are taken.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
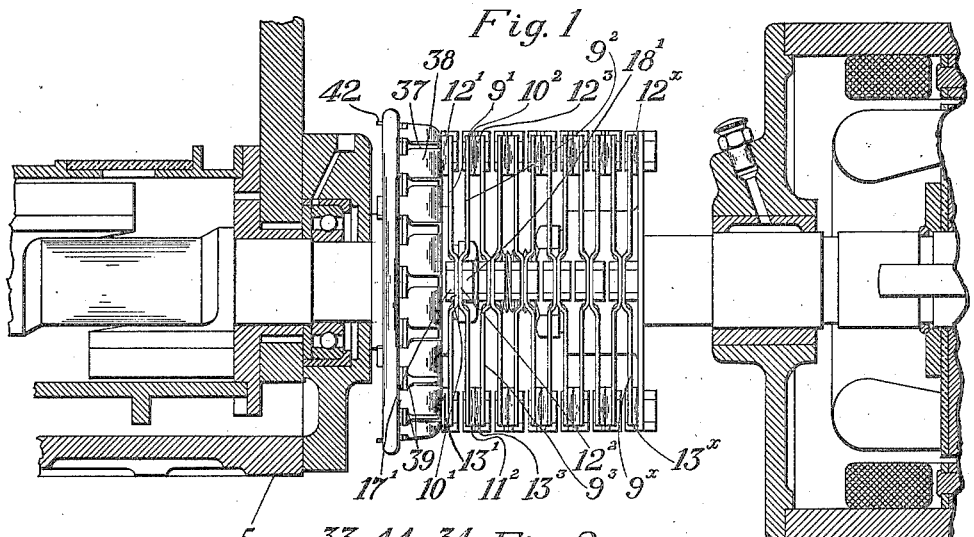
Figure 2:
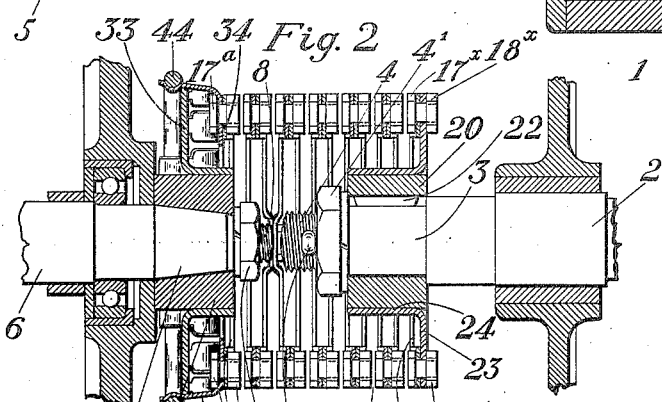
Figure 4:
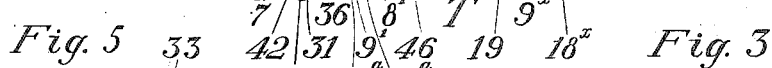
Figures 3, 5:
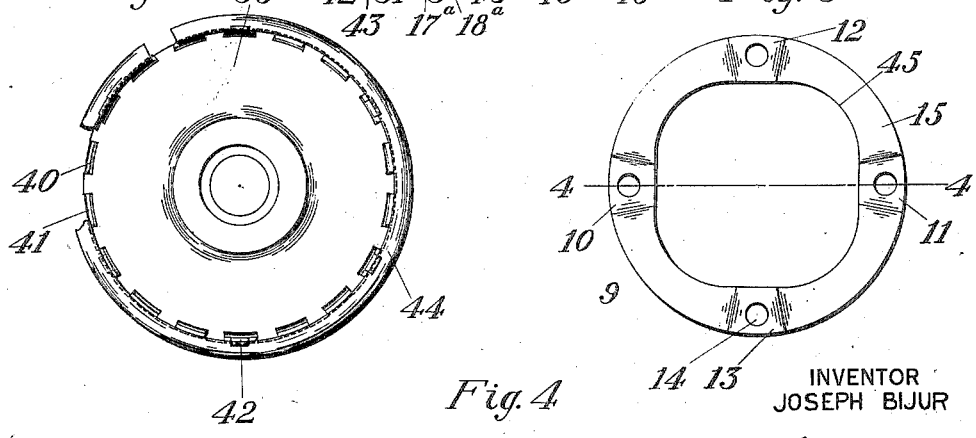

In the drawings wherein are shown one or more of various possible embodiments of the several features of this invention, Figure 1 is a side view of my coupling connected for operation. Figure 2 is a view taken in central longitudinal section of Figure 1 showing a coupling with a lesser number of plates. Figure 3 is a face view of one of the plates. Figure 4 is a sectional view taken along the line 4—4 of Figure 3, and Figure 5 is a plan of the coupling viewed from the magneto end.

Similar reference characters refer to similar parts throughout the different views of the drawings.

Referring now to the drawings I have indicated by way of example an application of my coupling for driving a magneto. There is shown a fragmentary view of a conventional electrical generator 1 having an armature shaft 2 with preferably the usual extension 3, having a threaded end 4 on which is threaded the usual lock nut $4^1$, and having a cotter-pin 46 or the equivalent extending through said threaded end.

In approximate alignment with generator shaft 2, I have shown a magneto 5, the details of which constitute no part of my invention and need therefore not be described. The magneto shaft 6 preferably, as is usual in magnetos, has a tapered extension 7 with a threaded end 8 on which is threaded a locknut $8^1$.

For the purpose of driving the magneto from the generator I provide my coupling which will now be described. It should be noted however that the drive of the magneto through the generator is only shown by way of example, my coupling being also applicable to good advantage for driving the magneto from any other engine-accessory, or from the engine direct without interposing any accessory machine.

The coupling is preferably built up of a plurality of superposed identical annular plates 9 of heat-treated spring steel, one of which is shown in Figures 3 and 4 apart from the rest of the construction. This member preferably has diametrically opposite concavities or depressions 10 and 11 extending the width thereof and along a relatively short sector, and identical diametrically opposite raised portions or convexities 12 and 13 midway between the depressions 10 and 11. Each concavity and convexity has a circular aperture 14 with its center on the bisector thereof and in proximity to the outer periphery of the plate. The plate may thus be regarded as made up of four quadrants or curved links 15, each extending between two adjacent apertures 14. The opening of the annulus is preferably a square having rounded corners 45 between the apertures 14 thus forming the central portion of each quadrant narrower and more flexible than the ends adjacent the apertures 14.

If the plate 9 be viewed from the side opposite that shown in Figure 3, obviously the concavities would appear as convexities and vice versa. To avoid confusion, each plate will therefore be regarded throughout the specification and the claims as viewed from the left in Figures 1 and 2, the adjacent plate, to the right of any given plate being designated as the "succeeding plate" with respect thereto. The plates starting with plate $9^1$ on the left will be designated in succession, as the first, second, third, etc.

Referring to the drawings the second plate $9^2$ is superposed upon the first with the two convexities of said second plate one against each of the concavities of the first plate. Figure 1 of the drawings shows one of said convexities at $12^2$ against one of said concavities $10^1$.

Means is provided for securing the two plates together at the said contacting portions, this means being by preference a pair of bolts, one of which is shown at $17^1$, each extending through one of the pair of aligned apertures in the contacting sectors, a nut $18^1$ being threaded onto each bolt thus firmly clamping the two plates together. The nut is preferably locked to the bolt by sweating, staking or equivalent means. Similarly the third plate $9^3$ is superposed upon the second, the convexities $12^3$ and $13^3$ of the said third plate resting respectively against the concavities $10^2$ and $11^2$ of the second plate, bolts and nuts being similarly employed for holding the said second and third plates together at diametrically opposite points. In this manner the plates are secured together, the concavities of each plate having the convexities of the succeeding one in contact therewith, said plates being clamped together at such contacting sectors by means of bolts and nuts.

Considering any bolt as associated with that one of the two plates it connects, on which its head rests, it is noted that any bolt in the assembled construction connects its associated plate with the next plate at points half-way between the bolts associated with such next plate. The bolts for each plate are thus displaced 90° with respect to the bolts for the adjacent plates. It is thus seen that the bolts connecting each even to the subsequent odd numbered plate are aligned and similarly the bolts connecting each odd to the subsequent even numbered plate are aligned, the second sets of bolts being half way between the first sets of bolts. It is noted that the head of each bolt is in relatively close proximity to the nut corresponding to the adjacent bolt in alignment therewith as at 19, for a purpose appearing more fully below.

The plates assembled as above described, designated on the drawings in their entirety by the latter T, constitute a flexible torque transmission member. This member, as will appear more fully below, has a limited amount of flexibility in every direction, except in that of torque transmission.

Means are preferably provided constituting a part of the coupling for securing the flexible member T to the generator or other driving shaft 2 at one end and to the magneto shaft 6 at the other. For this purpose I preferably provide a driving or generator shaft collar 20, adapted to fit over the shaft extension 3, and to be secured against rotation with respect to said extension by means of a Woodruff key 22 or some equivalent connection. The collar 20 is preferably provided as shown in the drawings with an annular flange 23 substantially at the extreme end of the coupling secured to the collar by spot welding or any other desired means or method as at 24.

The flange 23 is preferably secured to the last of the spring plates $9^x$, that is to the plate to the extreme right, by means of bolts $17^x$ passing through the concavities $12^x$ and $13^x$ of said plate, and having nuts $18^x$ threaded thereon and bearing against the right side of flange 23 to clamp plate $9^x$ and flange 23 together. It is to be understood that other means may be provided with good results for securing collar 20 to the flexible transmission T, but I prefer to employ the specific construction shown and described.

Means is also provided preferably also constituting a part of the coupling for securing the flexible member T to the magneto. For this purpose, I preferably provide an interiorly tapered magneto collar 31 adapted to fit snugly over the tapered shaft extension 7 and to be frictionally secured thereto by tightening nut $8^1$. The magneto collar 31 is provided with a flange 33 secured thereto in a similar manner to the connection of the flange 23 to the generator shaft collar 20.

The torque from the flexible member T is transmitted to the flange 33 by way of a lock plate 34 to which the first spring plate $9^1$ is preferably clamped at its convexities $12^1$ and $13^1$ by means of diametrically opposite screws $17^a$ passing through the lock plate, and co-operating nuts $18^a$ resting against the spring plate.

The locking plate has a flange 36 interrupted at equidistant points by slots 37 thus forming a plurality of tongues 38. Each tongue is provided with shoulders 39 at opposite edges and the flange 33 has equidistant peripheral slots 40 into which the ends of the tongues 38 extend as at 41.

By way of illustration I have shown every fourth tongue extending for an appreciable distance beyond the plate 33 as at 42 said portion 42 having a transverse groove 43 therein for lodging a lock ring 44.

The lock ring may thus be readily applied to firmly hold the tongue ends 42 within slots 40, thus preventing undesired loosening of the magneto collar. Said ring may be readily removed however to separate the magneto collar from the flexible member T, without strain on the latter, the connection being quick-detachable.

In the assembly of the device the first spring plate is first secured at convexities 12¹ and 13¹ to the lock plate 34 by means of bolts and nuts 17ᵃ, 18ᵃ. The plates are then successively built up in the manner fully described above, the flange plate 23 for the generator collar being finally secured to the last of the spring plates, 9ˣ.

To apply my coupling, I separate my magneto collar 31 and its attached flange 33 from the lock plate 34 by first removing lock ring 44. The magneto being apart from the engine, I apply the tapered magneto collar thereto and lock it in place frictionally by means of the lock nut 8¹. The coupling without the magneto collar is applied to the generator by passing collar 20 over the generator shaft end 3 and locking it in place by means of lock nut 4¹. By reason of the material space between the nut 4¹ and the interior contour of the flexible member, ample space is allowed for the use of a socket wrench to effect the tightening. Thereupon the magneto is mounted upon the engine for approximately correct timing, whereupon the slots 40 on plate 33 are fitted between the adjacent tongues 38 on plate 34, and held in place by lock ring 44. The application of the lock ring is easy, requiring no manipulations adjacent the shaft. Any further fine adjustment of the magneto may be made by rotation of the magneto collar relative to the magneto shaft.

By my construction it will be noted that although I provide a flexible member of substantial length and capable of allowing for the most extreme cases of shaft mis-alignment encountered in practice, yet the overall length of the coupling is in no way increased with respect to that of constructions in which shorter flexible elements more limited in their adaptability are employed. The flexible element of my coupling being generally tubular in contour completely encloses the shaft collars and the means for securing the same to the shafts, the flexible element itself being secured to the flanges 23 and 33 on the shaft collars, which flanges are substantially at the extreme ends of the coupling. The parts enclosed by the flexible element are portions essential to couplings regardless of design, since these parts include merely the shaft collars and the free ends of the shaft for accommodating securing nuts or the like for holding the collars in place. The flexible enclosing element for transmitting the torque adds nothing to this minimum length.

Moreover, the elements for securing the shaft collars to the shafts being completely enclosed by the flexible member of cylindrical contour, it will be seen that my construction avoids dangerous cutting projections.

In the application of this device the generator and magneto shafts need not be accurately aligned. Whether the shafts are at a small angle to each other or are parallelly displaced or are in slightly different planes, the coupling will yield slightly in the direction required for accommodation to such misalignment particularly at the more flexible portions 15 of the quadrants but this coupling as is apparent has substantially no flexibility in the torsional direction. In other words the flexibility of the coupling is substantially confined to the bending of the steel itself in the quadrants between the bolts, the joint between the plates being substantially rigid. In operation the magneto is thus kept in perfect timing relation to the driving shaft even though such shafts be misaligned in any of the various ways encountered in practice.

The gap 19 between each nut and the succeeding bolt head in alignment therewith is preferably made so small that any further flexure beyond that required for running out of line by more than in the neighborhood of $\frac{1}{16}$ of an inch is prevented, this amount of deflection exceeding that occurring under normal conditions.

Thus my coupling will successfully drive the magneto in perfect timing relation even though the adjacent shaft ends are as much as $\frac{1}{16}$ of an inch out of line.

By my invention it is to be noted that I not only render possible satisfactory magneto driving with misalignment of shafts but my apparatus is durable, as it distributes the flexure among a multiplicity of plates so that the bending for any individual plate will be only a fraction of the total bending which would be suffered if only a single flexure piece were employed.

If relatively sliding elements were included in a coupling for transmitting torque between misaligned shafts, relatively rapid wear would ordinarily take place, because of the difficulties attending lubrication of the parts, and looseness and noisy operation would occur after a relatively brief period of operation.

On the other hand if the coupling include fabric, leather or the like in its construction, its durability would obviously be materially below that of applicant's construction.

It is to be understood that I may assemble my coupling if desired, with the bolt heads occupying the position of the nuts and vice versa. It is further to be understood that other types of joints for the plates may be employed with good effect, instead of my bolts.

My coupling is not confined in its use to the driving of a magneto, but may be employed for driving apparatus, shafts or machines generally. As above suggested, my apparatus has especial utility in any driving relation where the shafts may be somewhat misaligned, and as above further indicated, it has further especial utility in any relation where torque transmission is to take place without relative displacement in the direction of the torque. Although my apparatus as shown is particularly applicable to magneto driving, it is thus seen that it may be used effectively in numerous other relations.

It will thus be seen that there is herein described apparatus in which the several features of this invention are embodied, and which apparatus in its action attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described my invention, what I claim as new and desire to secure by Letters-Patent is:

1. In a coupling, in combination, a plurality of coaxial circular spring plates, each said plate having deflections at diametrically opposite parts of its periphery for contact intermediate the said deflections of the succeeding plate, said plates being otherwise spaced from each other, and fasteners one for securing each said deflection to the part of the contiguous plate in contact therewith.

2. In a coupling, in combination, a plurality of coaxial circular spring plates, each said plate having deflections or the like at substantially diametrically opposite parts of its periphery, contacting the succeeding plate at parts of the periphery thereof midway between the deflections thereon, said plates being otherwise spaced from each other, and a plurality of bolts, for securing the respective deflections to the parts in contact therewith on the contiguous plates.

3. In a coupling, in combination, a plurality of substantially identical coaxial annular spring plates, each plate having diametrically opposite convexities, and substantially similar diametrically opposite concavities intermediate said convexities, the concavities of each plate contacting the convexities of the succeeding one, and a plurality of fastening means, tending through the contacting concavities and convexities of contiguous plates.

4. In a coupling, in combination, a plurality of substantially identical coaxial annular spring plates, each plate having alternate radial concavities and convexities spaced 90 degrees apart, the concavities of each plate contacting the convexities of the succeeding one, bolts extending through the contacting concavities and convexities of contiguous plates, and nuts co-operating with said bolts.

5. As an article of manufacture, an annular spring steel plate, having depressions in one side at diametrically opposite points, and similar depressions in the other side, mid-way between the first pair of depressions, each said depression having a bolt hole.

6. As an article of manufacture, an annular spring steel plate, having depressions in one side at diametrically opposite points, and similar depressions in the other side, mid-way between the first pair of depressions, each said depression having a bolt hole, said plate being reduced in cross-sectional area intermediate said bolt holes.

7. In a coupling, in combination, a magneto collar having a flange with equidistant slots at its periphery, a torque transmitting member including a plate having tongues extending at an angle thereto and into said slots, and a lock ring encircling said tongues near their free ends.

8. In a coupling, in combination, a plurality of superposed circular spring plates, each of said plates having a pair of fasteners securing it to the next at points intermediate the fasteners of the latter, one of the end plates having equidistant tongues extending at an angle thereto, a magneto collar having a flange, said tongues extending into slots in said flange, and means for preventing separation between said plates and said collar.

9. In a coupling or the like, in combination, a plurality of superposed spring plates, a pair of diametrically opposite bolts passing through each plate, and through openings half-way between the bolts of the succeeding plate, the plates being deflected toward each other where traversed by a bolt, and a nut co-operating with each bolt, whereby a small gap is left between any nut and the head of the adjacent bolt to limit the distortion of said plates.

10. In combination, a driving shaft, a substantially aligned driven shaft, a coupling connecting said shafts and comprising a shaft collar on each said shaft, each collar having a flange substantially at right angles to the axis thereof, substantially the entire length of said collars extending between said flanges, a flexible element having substantially the inner and outer contour of a tube, the inner diameter of said flexible element being materially larger than the diameter of said shaft to permit ready use of a tool for securing one of said collars to the corresponding shaft, and quick detachable means for securing the flange of the other collar to said flexible element.

11. The combination of claim 10 in which the coupling is cylindrical in contour from end to end, and free from cutting projections.

12. In combination, a driving shaft, a substantially aligned driven shaft, a coupling connecting said shafts and comprising a shaft collar on each said shaft, each collar having a flange substantially at right angles to the axis thereof, substantially the entire length of said collars extending between said flanges, a flexible element having substantially the inner and outer contour of a tube, the inner diameter of said flexible element being materially larger than the diameter of said shaft to permit ready use of a tool for securing one of said collars to the corresponding shaft.

In testimony whereof, I have signed my name to this specification this 12th day of April, 1919.

JOSEPH BIJUR.